(12) United States Patent
Langhans, Jr. et al.

(10) Patent No.: US 8,623,115 B2
(45) Date of Patent: Jan. 7, 2014

(54) ALKALINE AND ACID PRESSURE OXIDATION OF PRECIOUS METAL-CONTAINING MATERIALS

(75) Inventors: John William Langhans, Jr., Spring Creek, NV (US); Wilson Chung-Yeh Tsu, Elko, NV (US)

(73) Assignee: Barrick Gold Corporation, Toronto (CA)

( * ) Notice: Subject to any disclaimer, the term of this patent is extended or adjusted under 35 U.S.C. 154(b) by 0 days.

(21) Appl. No.: 13/301,435

(22) Filed: Nov. 21, 2011

(65) Prior Publication Data

US 2012/0128528 A1    May 24, 2012

Related U.S. Application Data

(60) Provisional application No. 61/416,214, filed on Nov. 22, 2010.

(51) Int. Cl.
*C22C 5/02*    (2006.01)
*C22C 5/04*    (2006.01)

(52) U.S. Cl.
USPC .................................. 75/744; 75/743; 75/711

(58) Field of Classification Search
USPC ........................................... 75/744, 711, 743
See application file for complete search history.

(56) References Cited

U.S. PATENT DOCUMENTS

| | | | |
|---|---|---|---|
| 2,777,764 A | 1/1957 | Norman et al. | |
| 2,878,102 A | 3/1959 | Sternfels | |
| 4,097,271 A | 6/1978 | Swinkels et al. | |
| 4,378,275 A | 3/1983 | Adamson et al. | |
| 4,552,589 A | 11/1985 | Mason et al. | |
| 4,571,263 A | 2/1986 | Weir et al. | |
| 4,571,264 A | 2/1986 | Weir et al. | |
| 4,578,163 A | 3/1986 | Kunter et al. | |
| 4,605,439 A | 8/1986 | Weir | |
| 4,670,051 A | 6/1987 | Schneider | |
| 4,731,114 A | 3/1988 | Ramadorai et al. | |
| 4,738,718 A | 4/1988 | Bakshani et al. | |
| 4,786,323 A | 11/1988 | Gock et al. | |
| 4,834,793 A | 5/1989 | Schneider et al. | |
| 4,878,945 A | 11/1989 | Raudsepp et al. | |
| 4,923,510 A | 5/1990 | Ramadorai et al. | |
| 4,979,987 A | 12/1990 | Mason et al. | |
| 5,071,477 A | 12/1991 | Thomas et al. | |
| 5,114,687 A | 5/1992 | Han et al. | |
| 5,262,136 A | 11/1993 | Smith et al. | |
| 5,308,381 A | 5/1994 | Han et al. | |
| 5,328,669 A | 7/1994 | Han et al. | |
| 5,397,380 A | 3/1995 | Petersson et al. | |
| 5,425,800 A | 6/1995 | Buter et al. | |
| 5,458,866 A | 10/1995 | Simmons | |
| 5,489,326 A | 2/1996 | Thomas et al. | |

(Continued)

OTHER PUBLICATIONS

International Search Report and Written Opinion for International (PCT) Patent Application No. PCT/US11/61697, mailed May 30, 2012 15 pages.

*Primary Examiner* — Rebecca Lee
(74) *Attorney, Agent, or Firm* — Sheridan Ross P.C.

(57) ABSTRACT

The present invention is directed to a precious metal recovery process in which an acid sulfidic feed material is subjected to acid pressure oxidation and an alkaline sulfidic feed material is subjected to alkaline pressure oxidation, with the discharge slurries from the pressure oxidation processes being combined to reduce neutralization requirements prior to precious metal recovery.

21 Claims, 6 Drawing Sheets

(56) References Cited

U.S. PATENT DOCUMENTS

| | | |
|---|---|---|
| 5,529,606 A | 6/1996 | Hewlett |
| 5,536,297 A | 7/1996 | Marchbank et al. |
| 5,536,480 A | 7/1996 | Simmons |
| 5,542,957 A | 8/1996 | Han et al. |
| 5,653,945 A | 8/1997 | Gathje et al. |
| 5,672,194 A | 9/1997 | Hunter et al. |
| 5,676,733 A | 10/1997 | Kohr |
| 5,851,499 A | 12/1998 | Gathje et al. |
| 6,086,656 A | 7/2000 | Kohr et al. |
| 6,146,444 A | 11/2000 | Kohr |
| 6,149,883 A | 11/2000 | Ketcham et al. |
| 6,159,435 A | 12/2000 | Nguyen |
| 6,210,648 B1 | 4/2001 | Gathje et al. |
| 6,383,460 B2 | 5/2002 | Jones |
| 6,387,155 B1 | 5/2002 | Kohr |
| 6,395,063 B1 | 5/2002 | Cole |
| 6,423,117 B1 | 7/2002 | Robinson |
| 6,503,293 B1 | 1/2003 | Dempsey et al. |
| 7,166,145 B1 | 1/2007 | Han |
| 2002/0152845 A1 | 10/2002 | Fleming et al. |
| 2002/0194963 A1 | 12/2002 | Kohr |
| 2003/0136225 A1 | 7/2003 | Simmons et al. |
| 2004/0081602 A1 | 4/2004 | Han et al. |
| 2004/0113333 A1 | 6/2004 | Podznoev et al. |
| 2004/0197249 A1 | 10/2004 | Wan et al. |
| 2005/0005737 A1 | 1/2005 | Kohr |
| 2005/0045528 A1 | 3/2005 | Simmons et al. |
| 2005/0188791 A1 | 9/2005 | Seeley et al. |
| 2007/0022843 A1 | 2/2007 | Bax et al. |
| 2007/0107550 A1 | 5/2007 | Kohr |
| 2007/0137437 A1 | 6/2007 | Choi et al. |
| 2007/0295613 A1 | 12/2007 | Moyes et al. |
| 2008/0066577 A1 | 3/2008 | Wan et al. |
| 2008/0066578 A1 | 3/2008 | Wan et al. |
| 2008/0274027 A1 | 11/2008 | Nicklin et al. |
| 2008/0286180 A1 | 11/2008 | Jones |
| 2009/0019970 A1 | 1/2009 | Ritchie et al. |
| 2009/0035833 A1 | 2/2009 | Kohr |
| 2009/0071295 A1 | 3/2009 | Gorain et al. |
| 2009/0071296 A1* | 3/2009 | Hillier et al. .............. 75/744 |
| 2009/0074608 A1 | 3/2009 | Hillier et al. |
| 2009/0288521 A1* | 11/2009 | Wan et al. ................ 75/744 |

* cited by examiner

ALKALINE AND ACID PRESSURE OXIDATION OF PRECIOUS METAL-CONTAINING MATERIALS

FIELD

The invention relates generally to hydrometallurgical processing of precious metal-containing materials and particularly to hydrometallurgical processing of refractory gold ores, concentrates, tailings, and other materials.

BACKGROUND

Many of the world's remaining gold deposits are considered to be refractory or double refractory in nature. Refractory ores are those in which the recoveries of gold by conventional cyanidation are typically noneconomic. Low gold recoveries can be caused by naturally occurring preg-robbing carbonaceous materials, which can pre-empt the absorption of gold by activated carbon in gold recovery processes. In addition, many gold ores are also sulfide refractory. The gold in sulfide refractory ores is inaccessible to gold lixiviants because the gold occurs as; particles finely disseminated within sulfide mineral crystals or as a solid solution in the sulphide matrix. The cost of size reduction associated with liberating this gold is often prohibitive, and, in the case of gold occurring as a solid solution, the size reduction is also generally ineffective. This problem has been overcome by oxidizing the sulfides contained in the ore, thereby liberating the gold from the sulfide matrix and rendering it amenable to leaching by cyanide or other lixiviants. Methods of oxidation employ bio-oxidation, roasting, atmospheric leaching and pressure oxidation. Pressure oxidation can be performed under alkaline conditions, as in the process disclosed by U.S. Pat. No. 4,552,589, or acid conditions, as disclosed by U.S. Pat. No. 5,071,477.

In alkaline pressure oxidation, the sulfuric acid produced during the oxidation step reacts with the carbonate or other acid consumers contained in the autoclave feed according to the following reactions (based on pyrite oxidation):

1 Oxidation: $4FeS_2 + 15O_2 + 2H_2O \rightarrow 2Fe_2O_3 + 8H_2SO_4$

2 Neutralization: $CaCO_3 + H_2SO_4 \rightarrow CaSO_4 + H_2O + CO_2 \uparrow$

The amount of carbonate, or other acid consumers, is in stoichiometric excess to the amount of acid that is generated by oxidation, and therefore the pH of the autoclave discharge is near neutral to alkaline depending upon the amount and type of acid consumers. When a portion of the gold occurs within the unreacted carbonates in the oxidized ore, the gold can remain inaccessible to lixiviants in subsequent gold leaching operations and thereby be unrecovered.

In acid pressure oxidation, the following reactions can occur:

3 Oxidation: $4FeS_2 + 15O_2 + 2H_2O \rightarrow 2Fe_2O_3 + 8H_2SO_4$

4 Oxidation: $4FeS_2 + 6O_2 + 2H_2O \rightarrow 2Fe_2O_3 + 6S° + 2H_2SO_4$

The prevalence of one reaction over the other depends on a number of factors including operating temperature, pressure, molecular oxygen overpressure, and residence time. No matter which of the oxidation reactions prevails, a substantial, amount of sulfuric acid is produced and must be neutralized. Acid neutralization costs can significantly increase plant operating costs.

SUMMARY

These and other needs are addressed by the various embodiments and configurations of the present invention. The present invention is directed generally to the parallel use of acid and alkaline pressure oxidation to treat refractory and double refractory sulfidic ores, concentrates, tailings, and other valuable metal-containing materials and the combination of the autoclave discharges produced therefrom.

The present invention can potentially address the shortcomings of acid and alkaline autoclave discharges. By combining the alkaline autoclave discharges with the acid pressure oxidation discharge a portion or all of the residual acid from the acid pressure oxidation is neutralized resulting in a substantial reduction of lime consumption. At the same time a portion or all of the unreacted carbonates in the alkaline discharge reacts with the acid, with the potential of liberating additional gold.

In one embodiment, an acid generating precious metal-containing autoclave feed material has more acid generators than consumers, and an alkaline or acid consuming precious metal-containing feed material has more acid consumers than generators. The acid generating feed material is subjected to pressure oxidation which produces an acidic discharge slurry while the alkaline autoclave feed material is subjected to alkaline pressure oxidation which produces an alkaline discharge slurry. The acidic and alkaline discharge slurries are combined to provide a combined discharge slurry having a pH higher than that of the acidic discharge slurry. The combination of the slurries can reduce lime or other alkali consumption thereby significantly reducing neutralization costs.

In another embodiment, an aqueous leach barren solution comprising a leaching agent is passed through a membrane filter to form an aqueous retentate (including most of the leaching agent) and an aqueous permeate (including some of the leaching agent). The aqueous retentate is recycled to a leaching step. Most of the leaching agent in the aqueous permeate is destroyed to form an aqueous recycle stream substantially free of leaching agent. The aqueous recycle stream is recycled to a unit operation upstream of the leaching step. The process can inhibit the recycle of lixiviant or leaching agent, in the recycle water, to other unit operations, which can cause precious metal leaching and consequent losses. This enables water recycling from the precious metal leach to upstream unit operations, thereby reducing water consumption, and permitting leaching agent recycle to leaching, thereby reducing reagent costs. Membrane filtration beneficially reduces the volume of leaching solution recycled to precious metal leaching and the concentration of leaching agent needing to be destroyed (thereby reducing reagent costs).

The embodiments of the present invention can provide a number of other advantages depending on the particular configuration. The process can combine the advantages of alkaline and acid pressure oxidation while offsetting their respective disadvantages. While alkaline pressure oxidation effectively treats highly carbonate materials, it cannot economically or effectively treat highly sulfidic materials. In contrast, acid pressure oxidation effectively treats highly sulfidic materials but not highly carbonate materials. The selective use of acid pressure oxidation to treat sulfidic materials having relatively low carbonate levels and alkaline pressure oxidation to treat carbonate materials having relatively low sulfide sulfur levels is more effective than blending the materials and treating them in the autoclave together. The generation of carbon dioxide within the autoclave from the reaction of generated sulfuric acid with carbonates is to be minimized whenever possible, as the generation of $CO_2$ within the autoclave will cause increased venting of the autoclave, which in turn causes the loss of $O_2$ and increased $O_2$ consumption and heating costs. For this reason, pre-acidification is commonly employed for low carbonate sulfidic ores. Pre acidification is generally not cost effective on high carbonate sulfide ores.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "acid consumer" refers to any compound that reacts with an acid to produce a salt or water.

The term "autoclave feed material" refers to all materials fed into the autoclave, For example, in acid POX the autoclave feed material may include additional acid, or may refer to ores which have been pre-acidified to reduce the level of acid consumers prior to the addition to the autoclave. In alkaline POX the feed material may include additional alkaline sources The term "acid equivalent" refers to an acid, which does not involve a proton transfer.

The term "acid generator" refers to a compound that will generate sulfuric acid. The most common form of acid generator is sulfide sulfur. A mole of an acid generator is defined as that amount which, under the particular pressure oxidation conditions, generates one mole of sulfuric acid. The "moles of total acid generators" is the sum of the moles of all acid generators present.

The term "autoclave" refers to any reactor that effects oxidation under super atmospheric conditions. An autoclave can be a single, multi-compartmented reactor or a reactor system including multiple, separate reactor vessels.

The term "carbonaceous material" and "TCM" refers to organic carbon-containing material. Examples of organic carbonaceous materials include humic acid, hydrocarbons, and activated carbon.

The term "dissociate" or "dissociable" and variations thereof refers to the process in which ionic compounds (complexes, molecules, or salts) separate or split into smaller molecules, ions, or radicals.

The term "dissolve" and variations thereof refer to is the process by which a solid or liquid enters its aqueous phase (solution).

The term "free sulfuric acid" refers to the excess sulfuric acid over the moles of total acid consumers present in the material.

The term "inorganic carbon" refers to binary compounds of carbon such as carbon oxides, carbides, carbon disulfides, etc., ternary compounds, and the metallic carbonates, such as calcium carbonate and sodium carbonate.

The term "mineral" and variations thereof refer to any naturally formed chemical substance having a definite chemical composition and characteristic crystal structure.

A "mole of an acid consumer" is defined as that amount which, under the particular pressure oxidation conditions, reacts with (consumes) one mole of sulfuric acid. The "moles of total acid consumers" is the sum of the moles of all acid consumers present. Exemplary classes of acid consumers include carbonates, oxides and hydroxides of metals. Acid consumers are commonly compounded with alkali and alkaline earth metals. Specific examples of acid consumers include carbonates, such as limestone, soda ash, trona, dolomite, and calcite; metal oxides such as lime, zinc oxide, magnesium oxide; hydroxides such as sodium hydroxide, potassium hydroxide, ammonia, ferric hydroxide, laterite, limonite, goethite, gibbsite, and diaspore; and various clays.

The term "precious metal" refers generally to gold, silver, and the platinum group or platinum metals. The platinum metals refer to a group of six metals, all members of group VIII of the Periodic Table of the Elements: ruthenium, rhodium, palladium, osmium, iridium, and platinum.

The term "solution derived therefrom" refers to a solution having at least one common component with the source solution from which the solution is derived, directly or indirectly. For example, a solution having a leaching agent, contaminant, or valuable metal found in the source solution is deemed to be derived therefrom. Thus, a raffinate or barren solution is deemed to be a solution derived from a pregnant leach solution. Likewise, a loaded extractant or electrolyte, which contains the valuable metal, or strip solution are deemed to be derived, directly or indirectly, from the pregnant leach solution.

The term "total acid" refers to both the free acid and other acid equivalents. Dissolved ferric sulfate and solid basic ferric sulfate are examples of acid equivalents.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present invention(s). These drawings, together with the description, explain the principles of the invention(s). The drawings simply illustrate preferred and alternative examples of how the invention(s) can be made and used and are not to be construed as limiting the invention(s) to only the illustrated and described examples. Further features and advantages will become apparent from the following, more detailed, description of the various embodiments of the invention(s), as illustrated by the drawings referenced below.

DETAILED DESCRIPTION

Figure 1A:
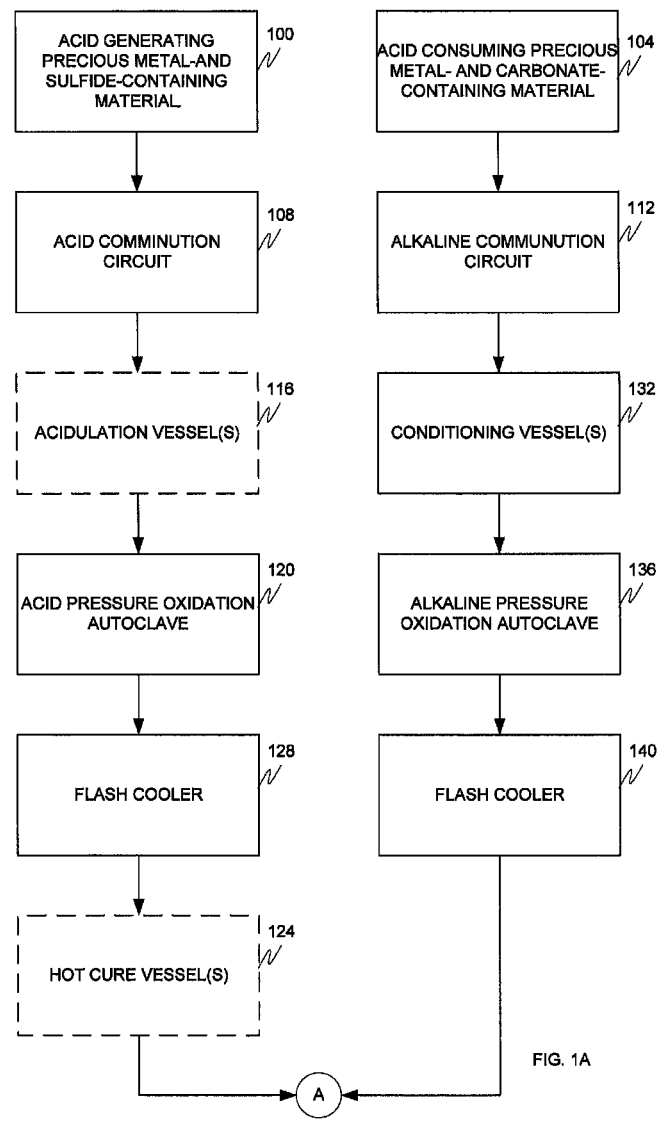
FIGS. 1A-B are block diagrams depicting a processing circuit for treating precious metal-containing materials according to an embodiment.
Figure 1B:
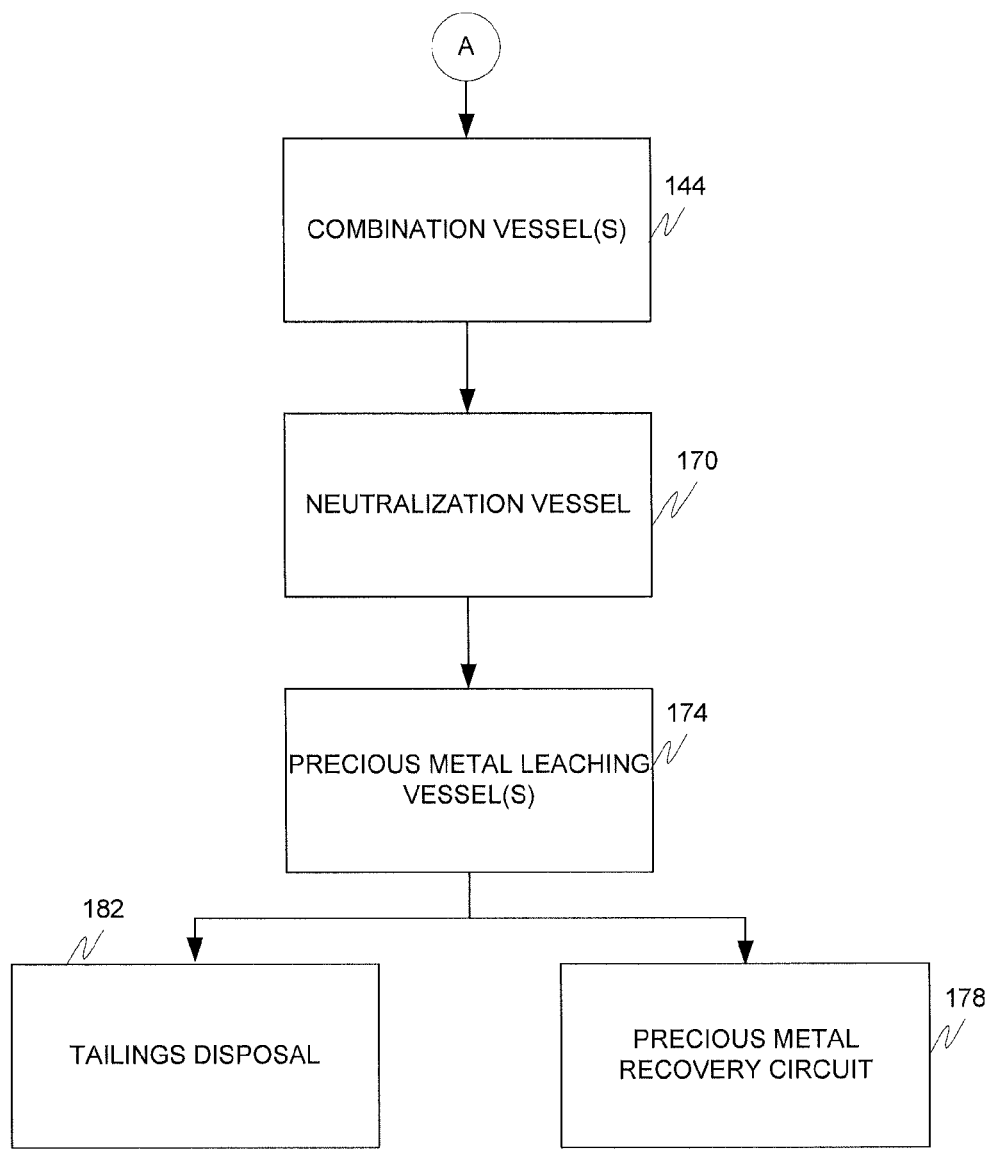
Figure 2A:
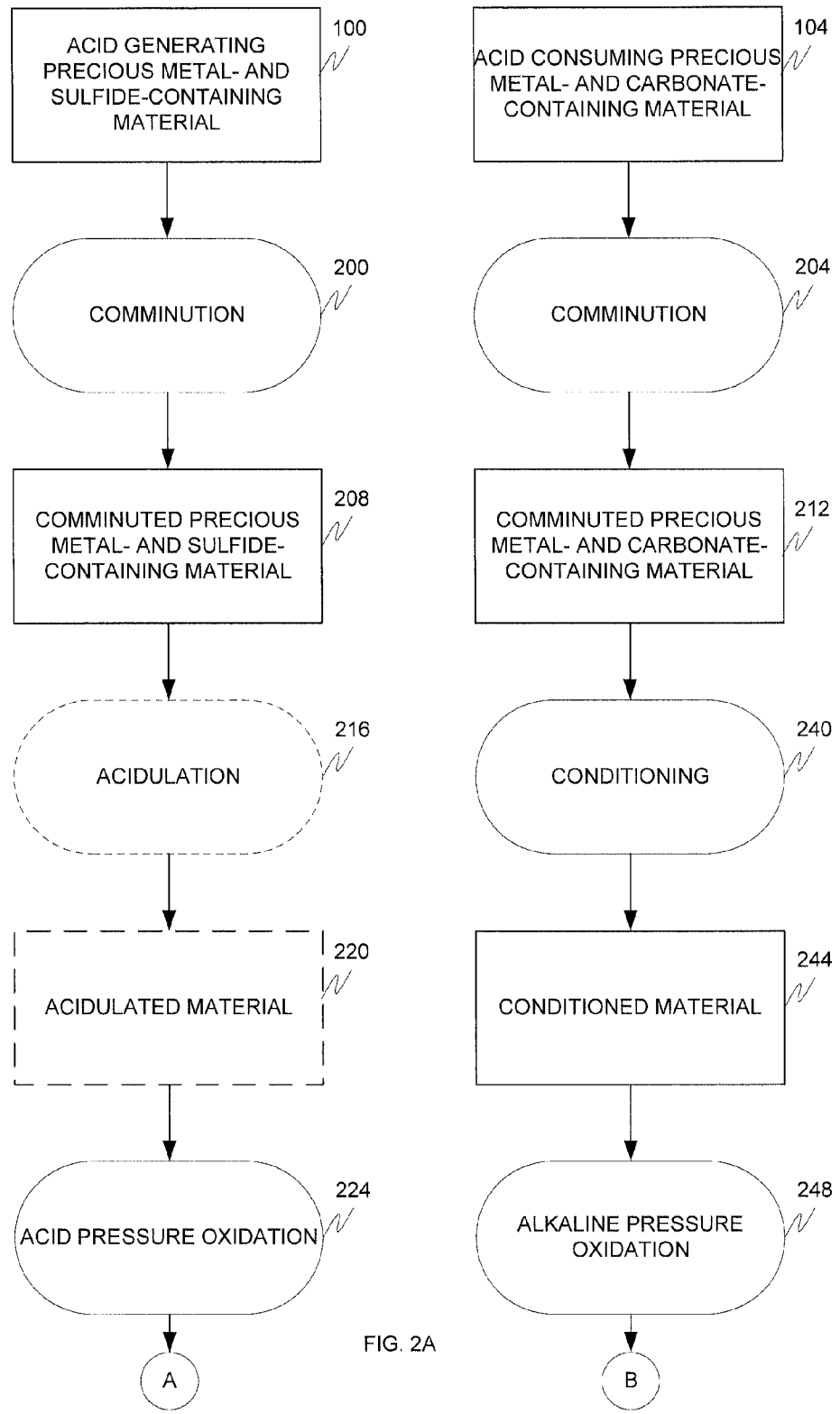
FIGS. 2A-C are block diagrams depicting a process for treating precious metal-containing materials according to an embodiment.
Figure 2B:
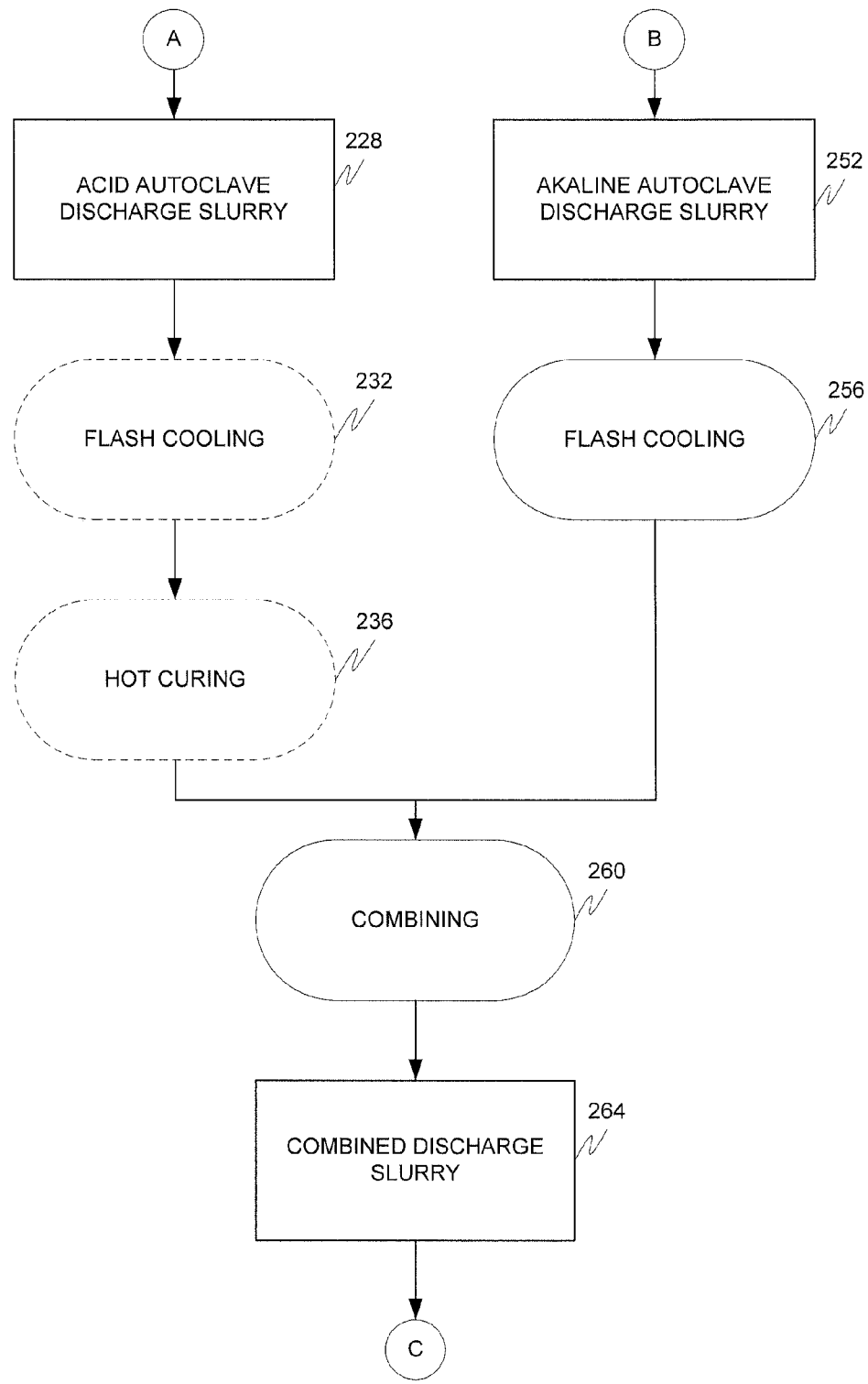
Figure 2C:
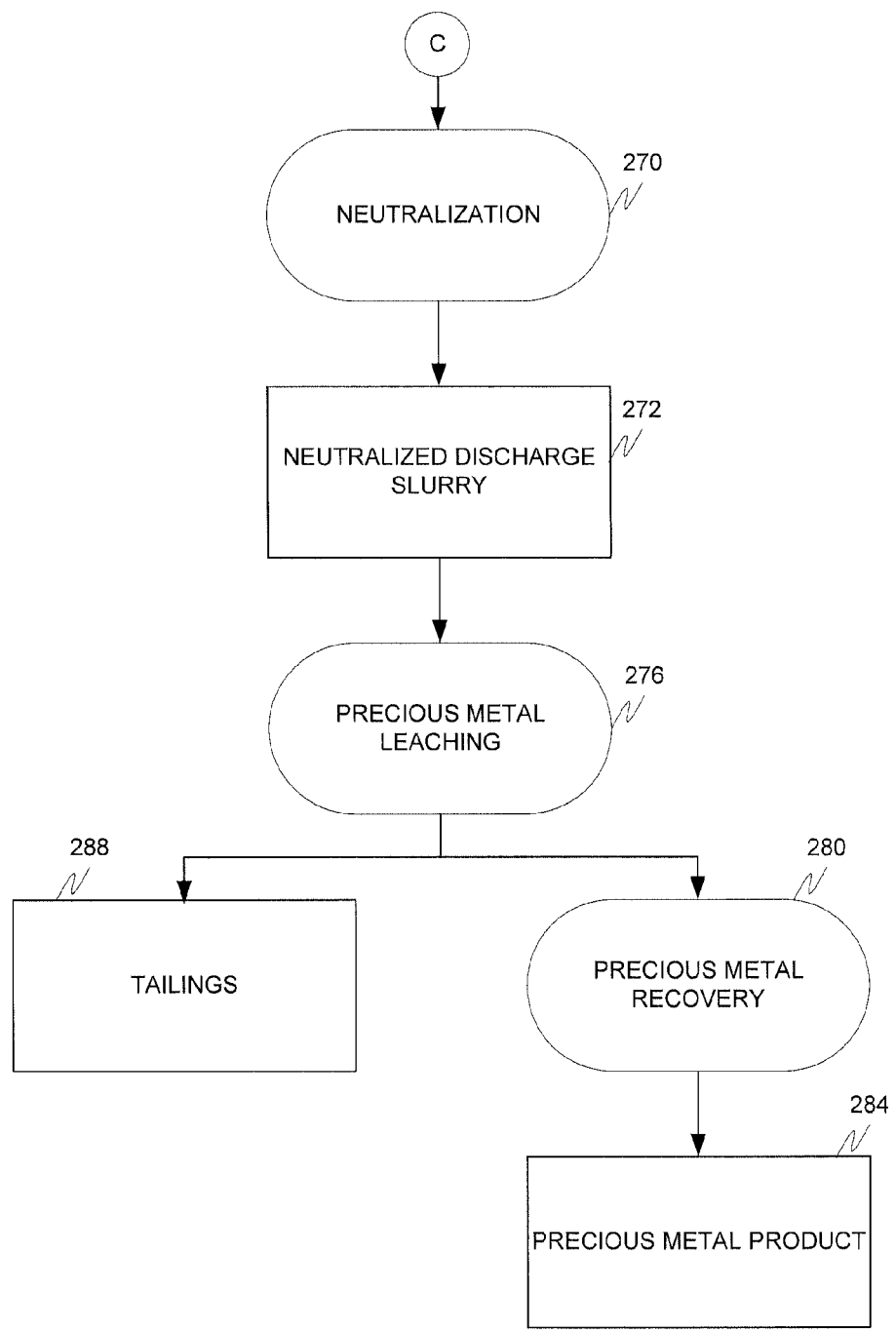

Referring to FIGS. 1A-B and 2A-C, the various process embodiments disclosed herein are directed to the simultaneous treatment of an acid generating precious metal- and sulfide-containing material 100 by pressure oxidation producing an acidic discharge slurry 228 and an acid consuming precious metal- and sulfide containing material 104 by pressure oxidation producing an alkaline discharge slurry 252. Pressure oxidation liberates precious metals from the refractory sulfide mineral matrix. The materials 100 and 104 are typically in the form of an ore, concentrate, tailings, such as reverse flotation tailings, a concentrate, such as a flotation concentrate, calcine, recycled industrial matter, or any other form from which precious metal may be recovered. The materials 100 and 104 typically contain no less than about 0.01 and even more typically from about 0.05 to about 10 (troy) ounces of precious metal (typically gold) per ton.

The acid generating precious metal- and sulfide-containing material 100 typically contains from about 1 weight percent to about 35, even more typically from about 2 to about 15, weight percent sulfide sulfur The material, as it enters the autoclave 120, contains an equivalent carbonate level, in the material, of preferably between about 0.1 and 1% by weight In some applications, the material 100, may be pre-acidulated to achieve the desired carbonate level. For ores such as those of sulfide-containing material 104, pre-acidulation to this extent of carbonate content is not economical.

The acid consuming or alkaline precious metal and sulfide containing material 104, on the other hand, typically contains, or is adjusted to contain, an equivalent carbonate level, in the material, of greater than about 0.7% by weight as the material enters the autoclave 136. Commonly, the material 104 contains from about 1 to about 45 percent by weight total inorganic carbon compounds (based on $CO_3$). Most, and typically at least about 90%, of the inorganic carbon present in the ores and concentrates is in the form of inorganic metal carbonates, such as limestone, dolomite, calcite, and magnesite. Carbonate ores and concentrates can contain sulfide sulfur primarily in the form of sulfides of iron, arsenic, and other metals. Commonly, carbonate ores and concentrates contain up to about 15 weight percent total sulfide sulfur and typically from about 0.1 to about 7 weight percent total sulfide sulfur.

The precious metal- and sulfide-containing materials 100 and 104 can be obtained in many ways. In one application, the materials 100 and 104 are excavated from different parts or zones of a stratified deposit. In other applications, the materials 100 and 104 are produced by floating a common feed material. The low carbonate sulfide-containing material 100, for example, can be a concentrate or tailings fraction. In another application, the materials 100 and 104 are excavated from different deposits.

In steps 200 and 204, respectively, the sulfide-containing low carbonate and high carbonate-containing materials 100 and 104, respectively, are comminuted and slurried by the corresponding acid and alkaline comminution circuits 108 and 112 to produce slurried comminuted precious metal- and sulfide-containing and carbonate-containing materials 208 and 212, respectively. The acid and alkaline comminution circuits 108 and 112 can be any open or closed crushing and/or grinding circuits and thickeners known to those of ordinary skill in the art. Typical comminution devices include autogeneous, semi-autogeneous, or non-autogeneous crushers, ball mills, rod mills, and the like. Thickening of the slurried comminuted materials is typically performed using polymeric flocculants. Although the size fraction depends on the mineralogies of the materials 100 and 104 and the liberation of the precious metal, the comminuted materials 208 and 212 preferably have a $P_{80}$ size of about 20 microns or higher, even more preferably of about 35 microns or higher, and even more preferably ranging from about 40 to about 150 microns. The slurried materials 100 and 104 typically have a pulp density of from about 10 to about 60, even more typically of from about 30 to about 55, and even more typically from about 50 to about 55 wt. % solids.

Acid Pressure Oxidation

Before pressure oxidation, the optionally pre-acidulated material 220 may be preheated, particularly when processing low sulfur feeds. Steam from the acid autoclave 120 and/or from the flash cooler 128 is contacted with the acidulated material, such as by splash condensers, to heat the material to a preferred temperature ranging from about 30 to about 115° C.

In step 224, the acidulated material 220 is subjected to pressure oxidation to oxidize preferably most, even more preferably about 75% or more, and even more preferably about 90% or more of the sulfide sulfur and form an acid autoclave discharge slurry 228. The oxidation product depends on the temperature regime. When the pressure oxidation temperature is in the range of from about 100 to about 170° C., a significant portion of the sulfide sulfur is converted into elemental sulfur. When the pressure oxidation temperature is above about 170 to about 240° C., sulfide sulfur is irreversibly oxidized to sulfate sulfur. In either case sulfuric acid is produced.

Most of the acid consumers in the (optionally preacidulated) material 220 will react with the generated sulfuric acid to yield a preferred pH of less than pH 7 and even more preferably ranging from about pH 0 to about pH 6.5. For example, carbonates present in the (optionally preacidulated) material 220 will react with the generated sulfuric acid, producing gypsum, water and carbon dioxide. To minimize the effect of carbon dioxide production, it is common practice to bleed off a portion of the gas in the vapor space to prevent carbon dioxide build-up and to recycle the large tail gas stream from pressure oxidation through an acid gas scrubber for particulate and sulfur dioxide removal.

The preferred reactor vessel for pressure oxidation is a sealed, multiple-compartment autoclave. The autoclave typically has at least six compartments to minimize short circuiting of the autoclave feed material 216 to the acid autoclave discharge slurry 228 as can occur in autoclaves with fewer compartments.

During pressure oxidation, sufficient molecular oxygen is introduced into the acid autoclave 120 to preferably maintain a molecular oxygen partial pressure ranging from about 20 to about 300 psig. The total pressure in the acid autoclave is preferably in the range of from about 250 to about 750 psig.

The duration of pressure oxidation depends upon a number of factors, including the mineral characteristics of the autoclave material 220 and the pressure oxidation temperature and pressure, particle size, and free acid levels. Preferably, the duration of pressure oxidation ranges from about 0.5 to about 3 hours.

The acid autoclave discharge slurry 228 contains a liquid phase including a variety of species, including dissolved (iron) sulfate sulfur and commonly from about 2 to about 150 g/L, more commonly less than about 25 g/L, even more commonly less than about 10 g/L, and even more commonly between about 5 and 25 g/L free sulfuric acid and a solid phase, including preferably most, more preferably about 95% or higher, and even more preferably about 99% or higher of the precious metal.

The acid autoclave discharge slurry 228, in step 232, is flashed in an open vessel or flashed cooler 124 to release pressure and evaporatively cool the slurry 228 through release of steam to form a flashed slurry. The flashed slurry typically has a pulp density of 30% by weight or higher.

In optional hot cure step 236, the acid autoclave discharge slurry 228 slurry is maintained, in one or more hot cure vessel(s) 128, at a preferred temperature of about 60° C. or higher, for a time sufficient for most of the solid-phase basic ferric sulfate to react with free sulfuric acid in the liquid phase to form dissolved ferric sulfate. The details of the hot cure step are disclosed in U.S. patent application Ser. Nos. 11/761, 103, filed Jun. 11, 2007, and 11/249,120, filed Oct. 11, 2005, (now U.S. Pat. No. 7,604,703), each of which is incorporated herein by this reference. The hot cure step 236 can reduce, significantly, lime consumption in later neutralization.

Alkaline Pressure Oxidation

The comminuted precious metal- and carbonate-containing material 212, in parallel, is conditioned in step 240, in one or more conditioning vessels 132, to form a conditioned material having a desired slurry pulp density (which is in the range set forth above) and containing an conditioning agent to inhibit, during pressure oxidation, the coating of the material 212 with insoluble metal compounds. While any suitable conditioning agent may be employed, preferred conditioning agents include trona ($Na_3(CO_3)(HCO_3) \cdot 2(H_2O)$), $NaCO_3$, NaOH, and mixtures thereof. For example, trona, when added in sufficient quantities, can substantially inhibit the formation of gypsum. Preferably, the amount of conditioning agent added ranges from about 5 to about 40 lb/ston and even more preferably from about 10 to about 30 lb/short ton (ston.)

The conditioned material 244 is subjected to alkaline pressure oxidation, in an alkaline autoclave 136 and in step 248 to form an alkaline autoclave discharge slurry 252. Alkaline pressure oxidation oxidizes sulfide sulfur to form sulfuric acid, which is neutralized by the acid consumers, such as inorganic metal carbonates (including the trona), in the conditioned material 244. Alkaline pressure oxidation (though operated under neutral or slightly alkaline pH), uses similar conditions of temperature (in the above-quoted temperature range), total pressure (in the above-quoted pressure range), molecular oxygen partial pressure (in the above-quoted molecular oxygen partial pressure range), autoclave residence time (in the above-quoted residence time range), as acid pressure oxidation. A primary difference is that typically most, and even more typically about 75% or more, and even more typically about 95% or more of the sulfuric acid generated by sulfide oxidation in the conditioned material 244, is rapidly neutralized by acid consumers in the material 244. In addition, unlike acid pressure oxidation, the degree of gold recovery is not as closely tied to the degree of sulfide oxidation, for or this reason the economic limit of percent sulfide oxidation of the alkaline material can be as low as 50%. The pH of the alkaline autoclave discharge slurry 252 is preferably about pH 6 or higher, even more preferably ranges from about pH 7 to about pH 9, and even more preferably ranges from about pH 7 to about pH 8. The pH of the discharge from the alkaline autoclave may be below 7, however if the acid base reaction is permitted to reach steady state, the pH will be between about pH 6 to about pH 8.

The alkaline autoclave discharge slurry 228 contains a liquid phase commonly having no more than about 1 g/L free sulfuric acid and acid equivalents. and a solid phase, preferably including preferably most, more preferably about 95% or higher, and even more preferably about 99% or higher of the precious metal.

The alkaline autoclave discharge slurry 252, output by the alkaline autoclave 136, is introduced into a flash cooler 140 and subjected to flash cooling in step 256.

Combination of Acid and Alkaline Autoclave Discharge Slurries

The acid and alkaline autoclave discharge slurries 228 and 252, after flash cooling 232 and 256 and optionally hot curing step 236, is preferably further cooled in indirect heat exchanges ahead of neutralization and precious metal recovery. Depending on the temperature after flash cooling, the acid autoclave discharge slurry may be subjected to indirect heat exchange cooling before the hot curing step 236. Although intermediate washing and/or liquid-solid separation may be employed, direct neutralization after cooling is preferred. The temperature of the hot acid autoclave discharge slurry is preferably reduced to between about 90° F. and about 140° F., more preferably between about 110° F. and about 130° F., and even more preferably below about 120° F.

In step 260, the partially cooled acid and alkaline autoclave discharge slurries 228 and 252 are combined, in one or more combination vessels 144 to form a combined discharge slurry 264, in which acid contained in the acid discharge 228 reacts with the carbonates and other acid consumers in the alkaline discharge. It is not necessary that the acid and alkaline discharge slurries be of equivalent volume. The pH of the combined slurry will be greater than that of the acid discharge, and lower than that of the alkaline discharge. As will be appreciated, the final pH of the combined discharge slurry 264 can be acidic or alkaline and varies depending on the relative volumes and acid consumer on the one hand and free acid and acid equivalent on the other hand contents of the acid and alkaline autoclave discharge slurries 228 and 252. In one application, the combined discharge slurry has less free sulfuric acid and/or acid equivalents than the acid discharge slurry 228 and/or more free sulfuric acid and/or acid equivalents than the alkaline discharge slurry 252. In one application, the combined discharge slurry has more acid consumers than the acid discharge slurry 228 and/or less acid consumers than the alkaline discharge slurry 252. The slurries are contained in a stirred neutralization vessel for 30 to 120 minutes.

Once the reaction between the acid and alkaline discharge is complete, the pH of the combined slurry is adjusted, if required, in step 270 and in one or more neutralization vessels 170 to a level suitable for the lixiviant employed, which is typically a pH of about pH 8 or higher.

The neutralization vessel(s) 170 can be in a single stirred stage or in multiple stirred stages, with two to six stages being common. Under the agitated conditions, decomposition occurs more rapidly because the residue is dispersed and suspended for more efficient contact with the acid consumer. The acid consumer is added while agitating the removed solid phase. The amount of lime required will depend upon the terminal pH of the combined slurry, and the target pH for gold recovery.

In step 276 and precious metal recovery circuit 178, the precious metals are dissolved by leaching the solid phase of the neutralized discharge slurry 272. Leaching is typically performed without additional liquid/solid separation or pulp density adjustment operations being performed on the neutralized discharge slurry 272. The leaching agent or lixiviant is typically cyanide, ammonium, sodium or calcium thiosulfate and less typically halides (iodide, bromide, chloride), and thiourea. In one configuration, the leaching step 276 is performed at atmospheric pressure and under alkaline conditions (at or above a pH of about pH 7) to produce a pregnant leach solution containing (at least) most of the precious metal content of the slurry 272. The precious metal leaching step 276 may be performed by any suitable technique including using cyanide leaching and Carbon-in-Pulp or CIP techniques, Carbon-In-Leach or CIL techniques, cementation techniques, Resin-in-Pulp or RIP techniques, Resin-In-Leach or RIL techniques, or by circulating a pregnant leach solution and/or slurry through one or more precious metal sorbent columns. In the CIL, CIP, RIP, RIL, and other sorbent-based techniques, a sorbent, such as activated carbon or an ion exchange resin, sorbs the precious metal dissolved in the lixiviant. The sorbed precious metal is stripped from the sorbent by an suitable eluant to form a barren sorbent for recycle to the leaching step 276 with and/or without regeneration, and a pregnant eluate containing most of the precious metal sorbed on the sorbent.

In the precious metal recovery step 280, the precious metal is recovered from the pregnant leach solution (or pregnant eluate) by suitable techniques, such as electrowinning or cementation followed by smelting, to form the precious metal product 284. When required, the barren solid residue or tailings 288 from the leaching step 276 is subjected to leaching agent detoxification or destruction and discarded at tailings disposal or impoundment area 182.

An embodiment of the precious metal recovery circuit 178 and process 280 will be discussed with reference to FIG. 3. In the depicted process, a barren leach solution, containing the lixiviant, is subjected to membrane filtration to recycle a retentate to the lixiviant to a precious metal-containing residue leaching step and a permeate to a lixiviant destruction step, with the lixiviant destroyed recycle water being used in other upstream process steps, such as comminution.

Figure 3:
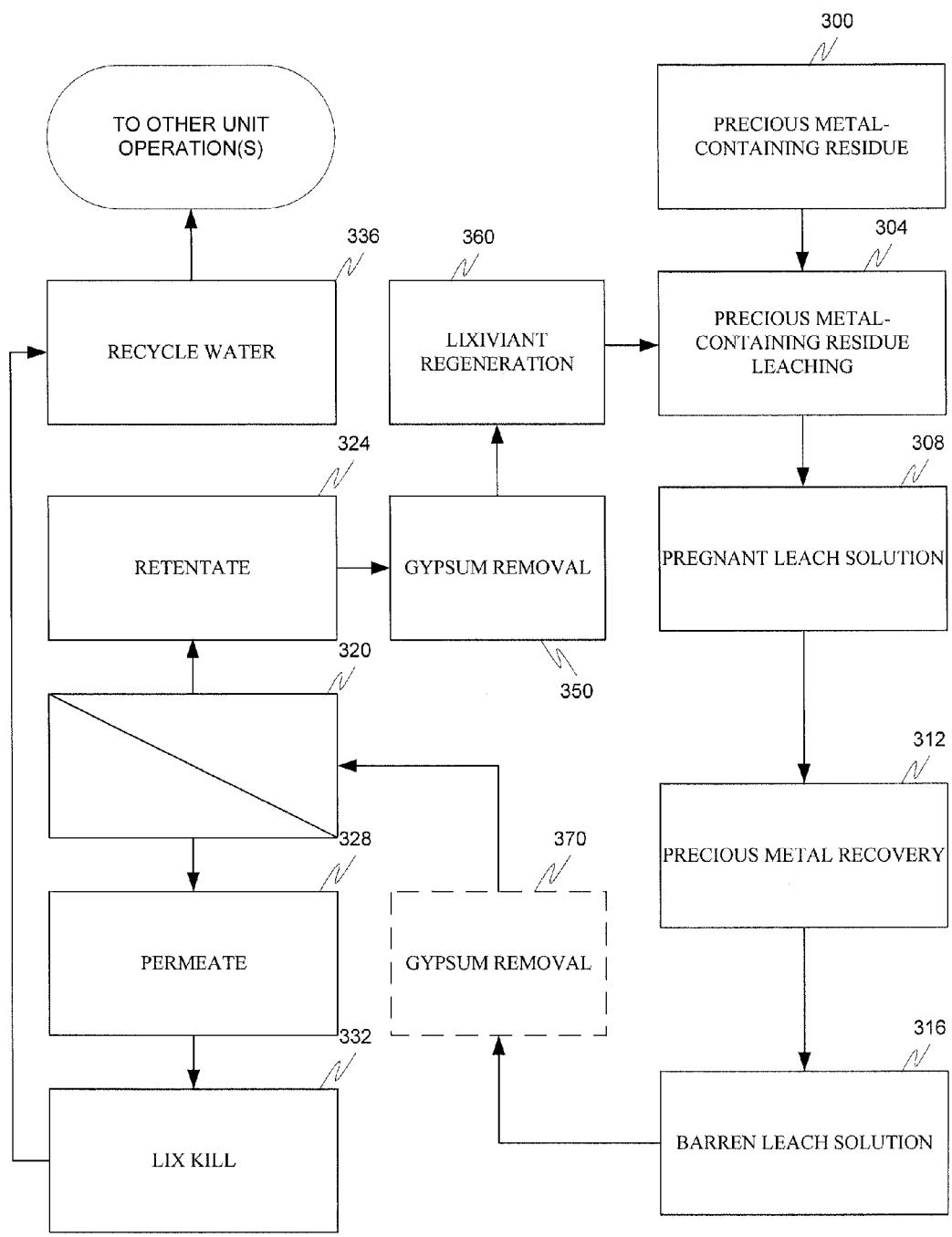
FIG. 3 is a block diagram depicting a process for regenerating a leaching solution according to an embodiment.

With reference to FIG. 3, the precious metal-containing residue 300 is subjected to precious metal-containing residue leaching in step 304 (as discussed above) to dissolve most of the precious metals from the residue and form a pregnant leach solution 308. In step 312, most of the precious metal is recovered, by any of the techniques noted above, from the pregnant leach solution 308 to form the precious metal product 284 and the barren leach solution 316 substantially free of dissolved precious metals. The barren leach solution 316 can be isolated from the residue by known liquid/solid separation techniques, such as thickening.

The barren leach solution 316, after optional gypsum removal step 370, is directed to membrane filtration step 320 to form a retentate 324 containing most of the lixiviant, or leaching agent, in the barren leach solution 316, and a permeate 328 containing some leaching agent and most of the water in the barren leach solution 316. Gypsum removal step 370 is performed when the dissolved gypsum exceeds the gypsum solubility limit that can be handled by the anti-scalant. Anti-sealant reagent costs can be decreased by decreased gypsum load following step 370. As will be appreciated, the anti-sealant is added following optional step 370 and before the membrane filtration step 320. The retentate is commonly less than 50% of the volume of the barren leach solution 316 while the permeate is commonly more than 50% of the barren leach solution volume. Preferably, only a single membrane filtration stage is employed to enable reduced osmotic pressure and avoid gypsum scaling from highly concentrated salts in subsequent filtration stages. The barren leach solution 316 may be softened with a water softener, such as soda ash, prior to filtration. The membrane filter may be any filter able to remove most of the lixiviant in the retentate. Preferably, from about 75 to about 95 and even more preferably from about 80 to about 92.5% of the leaching agent is separated into the retentate, leaving from about 5 to about 25% of the leaching agent in the permeate. Exemplary membrane filters include leaky reverse osmosis filters, nanofilters, ultrafilters, and microfilters.

The retentate 324 is recycled to the precious metal-containing leaching step 304. Prior to recycling, sodium carbonate is added to the retentate 324 stream, and precipitated gypsum is removed by clarification in the gypsum removal step 350, thus lowering the sulfate level circulating back to the leaching step 304 Gypsum precipitation is believed to result from decomposition of the anti-scalant added upstream of the membrane filtration step 320. Precipitated gypsum is recycled to step 350 to promote calcium removal. The recycled gypsum acts as a "seed" or nucleation site for further gypsum precipitation. When the lixiviant oxidatively decomposes, such as thiosulfate oxidatively decomposes to form polythionates, the retentate 324 may be regenerated in lixiviant regeneration step 360 before reuse in the leaching step 304. As will be appreciated, thiosulfate can be regenerated from polythionates by sulfite, sulfide, or polysulfide addition, and by thermal techniques.

The permeate 328 is oxidized in lixiviant destruction step 332 to destroy most, and even more commonly 95% or more of the residual leaching agent and form recycle water 336. The destruction products are substantially unable to leach precious metal(s). The particular process used to effect destruction depends on the leaching agent. Exemplary processes include volatilization (e.g., by pH or temperature changes, solution aeration or agitation, and combinations thereof), chemical or biological oxidation, adsorption, iron complexation, and precipitation.

In one application, an oxidation process is used in step 332 to destroy the lixiviant. The particular oxidation process depends on the particular leaching agent employed. Known chemical oxidants include hydrogen peroxide, sulfur dioxide/air, alkaline chlorine-hypochlorite, Caros acid, and ozone. By way of example, thiosulfate destruction can be done by reagents, such as hydrogen peroxide, and the $SO_2$/air. Thiosulfate, Caros acid, and residual sulfur species are oxidized to sulfates. As will be appreciated, excess oxidants can degrade the leaching agent in precious metal leaching. Accordingly, most of the residual oxidants are preferably consumed by super-stoichiometric addition of reductants. In one configuration, excess hydrogen peroxide is reacted with Caro's acid to form sulfates.

The recycle water 336, which is substantially free of the leaching agent and residual oxidants, is recycled to other unit operations.

EXPERIMENTAL

The following examples are provided to illustrate certain embodiments of the invention and are not to be construed as limitations on the invention, as set forth in the appended claims. All parts and percentages are by weight unless otherwise specified.

Example 1

Acid Pressure Oxidation Followed by Gold Recovery by Resin in Leach

The following double refractory gold ore was ground to $P_{80}$ 75 microns and pre-acidulated to remove excess carbonate prior to treatment by pressure oxidation. The assay for the feed and pre-acidulated feed material were:

| Element | Unit | Feed Assay | Acidualted Assay |
|---|---|---|---|
| Gold | ppm | 2.59 | |
| Total Sulfur | % | 1.36 | |
| Sulfide | % | 0.90 | 0.86 |
| Carbonate | % | 5.28 | 0.05 |
| TCM | % | 0.20 | |

Batch pressure oxidation was completed on 625 grams of the acidulated sample at a feed pulp density of 40% for a period of one hour at 200° C., with an oxygen over pressure of 80 psi. The pH of the autoclave discharge was 1.3. The sulfide level in the pressure oxidation discharge solids was measured at 0.07%, and therefore the percent sulfide oxidation was 92.7%. The pH of the discharge was adjusted and maintained at pH 8 using 39.5 kg $Ca(OH)_2$/tonne of ore. The gold was then recovered using strong base macroporous resin in leach, in which the gold lixiviant, calcium thiosulfate at a concentration 0.1M $S_2O_3$ was employed. The percent gold recovered was 70.8%.

Example 2

Alkaline Pressure Oxidation Followed by Gold Recovery by Resin in Leach

The following double refractory gold ore was ground to $P_{80}$ 75 microns and unlike the sample in example 1, it was not pre-acidulated. The assay for the feed was:

| Element | Unit | Assay |
|---|---|---|
| Gold | ppm | 10.7 |
| Total Sulfur | % | 2.06 |
| Sulfide | % | 1.49 |
| Carbonate | % | 13.1 |
| TCM | % | 0.15 |

Batch pressure oxidation was completed on 625 grams of sample at a feed pulp density of 40% for a period of one hour at 225° C., with an oxygen over pressure of 80 psi. 20 lb/ton of trona was added to the feed material prior to pressure oxidation. The pH of the autoclave discharge was 8.0. The sulfide content of the discharge was 0.61, and therefore the percent sulfide oxidation was 60.5%. The pH of the discharge was adjusted and maintained at pH 8 using 0.6 kg $Ca(OH)_2$/tonne of ore. The gold was then recovered using strong base macroporous resin in leach, in which the gold lixiviant, calcium thiosulfate at a concentration 0.1M $S_2O_3$ was employed. The percent gold recovered was 80.0%.

Example 3

Acid and Alkaline Pressure Oxidation Combined Discharge Followed by Gold Recovery by Resin in Leach The pressure oxidation steps were repeated using the same feed materials and conditions as outlined in Examples 1 and 2. The separate discharges from the autoclave were analyzed and details are shown in Table 3.

| Element | Unit | Acid Pressure Oxidation Discharge | Alkaline Pressure Oxidation Discharge |
|---|---|---|---|
| pH | — | 1.3 | 8.0 |
| Carbonate | % | N.A | N.A. |
| Sulfide | % | N.A | N.A |
| Gold | ppm | N.A. | N.A. |

The two discharge slurries were then combined 50/50 and mixed for a period of 30 minutes with a resulting pH of 6.77. The pH of the combined discharge is higher than that of the acid pressure oxidation discharge and lower than of the alkaline pressure oxidation discharge. 3.5 kg $Ca(OH)_2$/tonne of ore was added to adjust the pH to 8 prior to gold recovery by resin in leach. The lime consumption for the combined discharge was 36 kg/t less than that required to neutralize Example 1 acid discharge, and only 2.9 kg/t more than that required to adjust Example 2 alkaline discharge, indicating that the combination of the two discharge streams results in significant, reduction of lime consumption. The gold was then recovered using resin in leach, as outlined above. The percent gold recovered was 74.8, which is the median value of the gold recoveries achieved in examples 1 (70.8%) and 2 (80.0%).

Example 4

Combined Feed to Alkaline Pressure Oxidation Combined Discharge Followed by Gold Recovery by Resin in Leach Equal amounts of the acid feed material used in examples 1 and the alkaline feed used in example 2 were blended to produce an autoclave feed material containing:

| Element | Unit | Assay |
|---|---|---|
| Gold | ppm | 6.73 |
| Total Sulfur | % | |
| Sulfide | % | 1.09 |
| Carbonate | % | 8.84 |
| TCM | | |

Because of the high carbonate level in the combined feed alkaline pressure oxidation was performed. Batch pressure oxidation was completed on 625 grams of sample at a feed pulp density of 40% for a period of one hour at 225° C., with oxygen over pressure of 80 psi. 20 lb/ton of trona was added to the feed material prior to pressure oxidation. The pH of the autoclave discharge was 7.6. The sulfide content of the discharge was 0.48%, and therefore the percent sulfide oxidation was 58.6—lower than the sulfide oxidation observed in examples 1 (92.7%) and 2 (60.5%). The pH of the discharge was adjusted to 8 using 1.5 kg $Ca(OH)_2$/tonne of ore. This is slightly lower than the lime consumption in example 3. The gold was then recovered using resin in leach, and the percent gold recovered was 74.5%. This is the same as the gold recovery in example 3.

A number of variations and modifications of the invention can be used. It would be possible to provide for some features of the invention without providing others.

The present invention, in various embodiments, configurations, or aspects, includes components, methods, processes, systems and/or apparatus substantially as depicted and described herein, including various embodiments, configurations, aspects, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence, of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A process, comprising:
   (a) pressure oxidizing, at a pH of less than pH 6.5, an acid generating feed material comprising a valuable metal and sulfide sulfur to form an acid discharge slurry comprising sulfate sulfur and having a first pH of less than pH 6.5;
   (b) pressure oxidizing, at a pH of at least pH 6.5, an acid consuming feed material comprising the valuable metal and sulfide sulfur to form an alkaline discharge slurry comprising sulfate sulfur and having a second pH of at least pH 6.5; and
   (c) combining the acid and alkaline discharge slurries to provide a combined discharge slurry having a third pH greater than the first pH and less than the second pH.

2. The process of claim 1, wherein the valuable metal is a precious metal, wherein the acid generating feed material comprises more total moles of acid generators than acid consumers, and wherein the acid consuming feed material comprises more total moles of acid consumers than acid generators.

3. The process of claim 2, wherein an equivalent carbonate level in the acid generating feed material ranges from about 0.1 to about 1% by weight and wherein an equivalent carbonate level in the acid consuming feed material is at least about 0.7% by weight.

4. The process of claim 1, wherein the acid discharge slurry comprises at least about 2 g/L free sulfuric acid while the alkaline discharge slurry comprises no more than about 1 g/L free sulfuric acid and acid equivalents.

5. The process of claim 1, wherein at least most of the sulfide sulfur in the acid generating, and acid consuming feed materials is oxidized in steps (a) and (b) and wherein at least most of the oxidized sulfide sulfur in the acid and alkaline discharge slurries is in the form of sulfate sulfur.

6. The process of claim 1, wherein the acid discharge slurry comprises from about 2 to about 150 g/L free sulfuric acid and acid equivalents, wherein the alkaline discharge slurry comprises no more than about 1 g/L free sulfuric acid and acid equivalents, wherein the combined discharge slurry has an acidic pH and contains less free sulfuric acid and acid equivalents than the acid discharge slurry and more free sulfuric acid and acid equivalents than the alkaline discharge slurry, and wherein the valuable metal is gold and further comprising:
   (d) after step (c), further increasing a pH of the combined discharge slurry to form a combined feed slurry having a fourth pH, the fourth pH being equal to or higher than the third pH; and
   (e) recovering gold from a solid phase of the combined feed slurry.

7. The process of claim 1, wherein the acid discharge slurry comprises from about 2 to about 150 g/L free sulfuric acid and acid equivalents, wherein the alkaline discharge slurry comprises no more than about 1 g/L free sulfuric acid and acid equivalents, wherein the combined discharge slurry has an alkaline pH and contains less acid consumers than the alkaline discharge slurry and more acid consumers than the acid discharge slurry, and wherein the valuable metal is gold and further comprising:
   (d) after step (c), further increasing a pH of the combined discharge slurry to form a combined feed slurry having a fourth pH, the fourth pH being higher than the first, second, and third pH's; and
   (e) recovering gold from a solid phase of the combined feed slurry.

8. A process, comprising:
   (a) pressure oxidizing, at a pH of less than pH 6.5 and in an acid autoclave, an acid Generating and, precious metal-containing feed material comprising an acid generator and acid consumer to form an acid generating and, discharge slurry comprising generated acid and having a first pH of less than pH 6.5;
   (b) pressure oxidizing, at a pH of at least pH 6.5 and in an autoclave, an acid consuming and precious metal-containing feed material comprising the acid generator and acid consumer to form an alkaline discharge slurry comprising sulfate sulfur and having a second pH of at least pH 6.5;
   (c) combining the acid and alkaline discharge slurries to provide a combined discharge slurry having a third pH greater than the first pH and less than the second pH; and
   (d) thereafter recovering the precious metal from a solid phase of the combined discharge slurry.

9. The process of claim 8, wherein the acid generating and precious metal-containing feed material comprises more total moles of acid generators than acid consumers and wherein the acid consuming and precious metal-containing feed material comprises more total moles of acid consumers than acid generators.

10. The process of claim 9, wherein an equivalent carbonate level in the acid generating and precious metal-containing feed material ranges from about 0.1 to about 1% by weight and wherein an equivalent carbonate level in the acid consuming and precious metal-containing feed material is at least about 0.7% by weight.

11. The process of claim 8, wherein the acid generator is primarily sulfide sulfur and wherein the acid discharge slurry comprises at least about 2 g/L but less than about 25 g/L, free sulfuric acid and acid equivalents while the alkaline discharge slurry comprises no more than about 1 g/L free sulfuric acid and acid equivalents.

12. The process of claim 11, wherein at least most of the sulfide sulfur in the acid generating and acid consuming feed materials is oxidized in steps (a) and (b) and wherein at least most of the oxidized sulfide sulfur in the acid and alkaline discharge slurries is in the form of sulfate sulfur.

13. The process of claim 8, wherein the acid discharge slurry comprises from about 2 to about 150 g/L free sulfuric acid and acid equivalents, wherein the alkaline discharge slurry comprises no more than about 1 g/L free sulfuric acid and acid equivalents, wherein the combined discharge slurry has an acidic pH and contains less free sulfuric acid and acid equivalents than the acid discharge slurry and more free sulfuric acid and acid equivalents than the alkaline discharge slurry, and wherein the valuable metal is gold and further comprising:
after step (c) and before step (d), further increasing a pH of the combined discharge slurry to a fourth pH, the fourth pH being equal to or higher than the third pH.

14. The process of claim 8, wherein the acid discharge slurry comprises from about 2 to about 150 g/L free sulfuric acid and acid equivalents, wherein the alkaline discharge slurry comprises no more than about 1 g/L free sulfuric acid and acid equivalents, wherein the combined discharge slurry has an alkaline pH and contains less acid consumers than the alkaline discharge slurry and more acid consumers than the acid discharge slurry, and wherein the valuable metal is gold and further comprising:
after step (c) and before step (d), further increasing a pH of the combined discharge slurry to a fourth pH, the fourth pH being higher than the first, second, and third pH's.

15. A process, comprising:
(a) pressure oxidizing, at a pH of less than pH 6.5 and in an acid autoclave, an acid generating and gold-containing feed material comprising an acid generator and acid consumer to form an acid discharge slurry comprising generated acid and having a first pH of less than pH 6.5;
(b) pressure oxidizing, at a pH of at least pH 6.5 and in an alkaline autoclave, an acid consuming and gold-containing feed material comprising the acid generator and acid consumer to form an alkaline discharge slurry comprising sulfate sulfur and having a second pH of at least pH 6.5;
(c) combining the acid and alkaline discharge slurries to provide a combined discharge slurry having a third pH greater than the first pH and less than the second pH;
(d) further increasing a pH of the combined discharge slurry to a fourth pH, the fourth pH being higher than the first, second, and third pH's; and
(e) thereafter recovering the gold from a solid phase of the pH adjusted combined discharge slurry.

16. The process of claim 15, wherein the acid generating and gold-containing feed material comprises more total moles of acid generators than acid consumers, and wherein the acid consuming and gold-containing feed material comprises more total moles of acid consumers than acid generators.

17. The process of claim 16, wherein an equivalent carbonate level in the acid generating and gold-containing feed material ranges from about 0.1 to about 1% by weight and wherein an equivalent carbonate level in the acid consuming and gold-containing feed material is at least about 0.7% by weight.

18. The process of claim 15, wherein the acid generator is primarily sulfide sulfur and wherein the acid discharge slurry comprises at least about 2 g/L, but less than about 25 g/L, free sulfuric acid while the alkaline discharge slurry comprises no more than about 1 g/L free sulfuric acid.

19. The process of claim 18, wherein at least most of the sulfide sulfur in the acid generating and acid consuming feed materials is oxidized in steps (a) and (b) and wherein at least most of the oxidized sulfide sulfur in the acid and alkaline discharge slurries is in the form of sulfate sulfur.

20. The process of claim 15, wherein the acid discharge slurry comprises from about 2 to about 150 g/L free sulfuric acid and acid equivalents, wherein the alkaline discharge slurry comprises no more than about 1 g/L free sulfuric acid and acid equivalents, and wherein the combined discharge slurry has an acidic pH and contains less free sulfuric acid and acid equivalents than the acid discharge slurry and more free sulfuric acid and acid equivalents than the alkaline discharge slurry.

21. The process of claim 15, wherein the acid discharge slurry comprises from about 2 to about 150 g/L free sulfuric acid and acid equivalents, wherein the alkaline discharge slurry comprises no more than about 1 g/L free sulfuric acid and acid equivalents, and wherein the combined discharge slurry has an alkaline pH and contains less acid consumers than the alkaline discharge slurry and more acid consumers than the acid discharge slurry.

* * * * *